June 14, 1949.  M. J. LARSEN  2,473,208
APPARATUS FOR LINEARIZING SAW-TOOTH WAVES
Filed Nov. 14, 1944
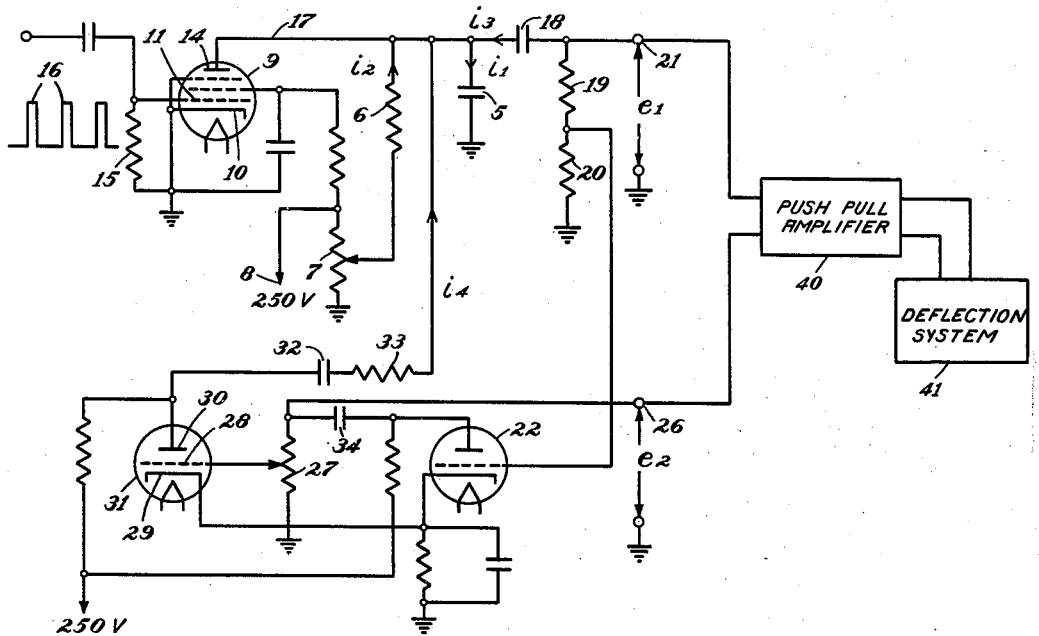
Fig.1
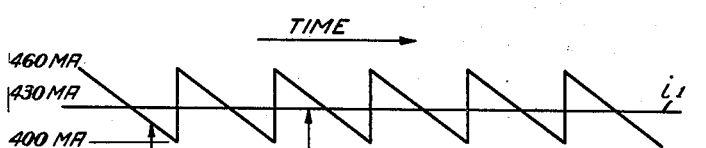
Fig.2
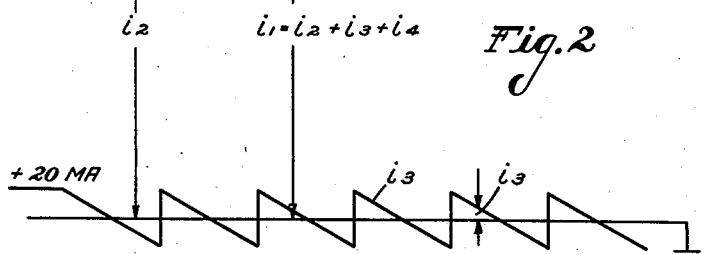
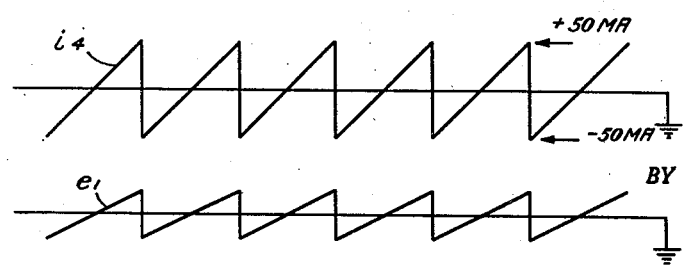
INVENTOR.
MERWIN J. LARSEN
BY D. Clyde Jones
ATTORNEY Patented June 14, 1949

2,473,208

UNITED STATES PATENT OFFICE 2,473,208

APPARATUS FOR LINEARIZING SAW-TOOTH WAVES

Merwin J. Larsen, Rochester, N. Y., assignor to Stromberg-Carlson Company, Rochester, N. Y., a corporation of New York Application November 14, 1944, Serial No. 563,388

2 Claims. (Cl. 250—36)

This invention relates to a method of and to apparatus for generating saw-tooth waves.

A common method for generating saw-tooth voltage waves employs a circuit having a capacitor, a suitable resistor and a constant potential source connected in series therein. The capacitor is charged to a fraction of the value of the supply potential and then discharged abruptly through a low resistance discharge path periodically completed across the terminals of the capacitor. This method affords a reasonable approach to linearity between charging voltage and time, if the capacitor is allowed to charge to only a small fraction of the supply voltage. However, in order to utilize the resulting saw-tooth voltage, perhaps by amplification, it is often necessary to connect a load resistor across the mentioned capacitor. This connection further reduces the charging current as the capacitor voltage rises.

One feature of the present invention relates to a method of linearizing a saw-tooth wave.

Another feature of the invention relates to apparatus for producing a constant charging current in the charging capacitor included in a conventional saw-tooth generator.

An additional feature of the invention relates to a method of introducing into a saw-tooth generator network, an additional current by positive feed back action which additional current compensates for that lost in the charging circuit of the conventional capacitor.

A further feature of the invention relates to a method of and to apparatus for providing a linearized saw-tooth wave with a larger voltage than can be derived from conventional generators.

Other features and advantages will appear from the detailed description and claims when taken with the drawings in which:

Fig. 1 is a diagrammatic showing of a saw-tooth generator constructed in accordance with the present invention and by which the method of the present invention may be practised; and Fig. 2 is a chart showing certain wave forms useful in describing the present method and apparatus.

In the present arrangement, as in conventional saw-tooth generators, there is provided a capacitor 5 which is arranged to be charged through the resistor 6, with current supplied through the potentiometer 7, from a positive supply 8. The use of potentiometer 7 permits adjustment of the amplitude of the voltage applied to the capacitor 5. The capacitor 5 is periodically discharged through the electron discharge tube 9 such as a pentode tube having the characteristics of a tube now sold under the code number 6SJ7. The input circuit of this tube which is connected to the cathode 10 and grid 11 includes the resistor 15. An input voltage, having repetitive strong positive peaks, as indicated at 16, is supplied across the resistor 15. The mentioned input voltage 16 may be generated by any well known means, such as a blocking oscillator (not shown). This peak voltage is of such value that it causes the tube 9 to conduct and thereby to discharge the capacitor 5 rapidly through conductor 17 and across the space between the anode 14 and cathode 10 of this tube, to ground. After the capacitor has thus discharged to a fairly low value, the tube 9 is biased to cut-off by the mentioned input voltage, now of reduced value, so that no current flows in the plate circuit of tube 9 and the mentioned discharge path of capacitor 5, is interrupted. A load circuit comprising a capacitor 18 and resistors 19 and 20, is connected to the conductor 17 and one terminal of the capacitor 5 so that the desired saw-tooth voltage wave form $e_1$, resulting from the alternately recurring charge and discharge of capacitor 5, can be taken off at the terminal 21.

The charging current $i_2$ decreases in value as the capacitor 5 becomes charged and this charging current is further decreased by the current $i_3$, the amount depending on the load. Such decreasing charging current tends to render the resulting saw-tooth voltage wave non-linear. In accordance with the present invention, there is provided a novel method and novel apparatus for supplying by means of positive feed-back control action, a supplemental current which compensates for the mentioned decreasing charging current so that a substantially constant charging current is supplied to the capacitor 5. The positive feedback arrangement is shown in the lower part of Fig. 1, whereby a portion of the voltage $e_1$ present across resistors 19 and 20, activates triode 22 which is connected as a conventional phase inverter. Thus, a saw-tooth voltage wave $e_2$ similar to $e_1$ but of opposite phase with respect thereto can be taken off at terminal 26. By proper adjustment of the divider resistors 19 and 20, the voltage $e_2$ at terminal 26 can be made to have the same amplitude as voltage $e_1$ but of opposite phase because of the phase inversion. Voltages $e_1$ and $e_2$ can be amplified in a suitable amplifier 40 and can then be used to effect magnetic or electrostatic deflection in connection with a cathode ray tube deflection system 41.

A portion of the voltage $e_2$ present across potentiometer 27 activates the grid 28 of a thermionic unit such as triode 31, also provided with a cathode 29 and anode 30. The output of this triode supplies additional charging current $i_4$ through capacitor 32 and resistor 33 directly to capacitor 5, which current is in phase with the original voltage across the capacitor 5. The compensating current is thus conducted to the capacitor 5 by means of a separate path which is in parallel relationship with respect to the path of the charging current. It is necessary that the magnitudes of the reactances of capacitors 18, 34 and 32 be very low as compared with their associated resistors 19, 20, 27 and 33 respectively.

If the input of the triode 31 is properly adjusted by means of the potentiometer 27, the current $i_4$ can be easily adjusted to compensate for variations in the charging current $i_1$, so that the charging current is constant during the charging period. A predetermined amount of over or under compensation is also possible in this arrangement, in case either is desired.

While triodes 22 and 31 have been disclosed it should be understood that they may be replaced by a single twin-triode tube such as is now sold under the code number 6SN7.

Fig. 2 shows the voltage wave form $e_1$ and the four currents involved in the charging of capacitor 5, the wave forms being shown under conditions of proper compensation. It should be noted that the current $i_2$ becomes smaller as the potential across capacitor 5 increases because the difference across resistance 6 decreases. The current $i_3$ further decreases the charging current, the amount depending upon the load. It is necessary that the compensating current $i_4$ supply the deficiency of $i_2$ and $i_3$. Neglecting tube distortion in triodes 22 and 31, the voltage wave on the plate 30 of triode 31 is the same in shape as $e_1$ except for the amplitude. Hence, a saw-tooth current $i_4$ can be supplied which compensates for the drop produced by that from $i_2$ and $i_3$ alone. Under normal conditions, where the compensating current $i_4$ need not be excessive, the distortion in the triodes 22 and 31 would have a very minor effect because the compensating current itself is small. From the foregoing, it may be stated that the algebraic sum of the primary current ($i_2$) plus the load current ($i_3$) and the compensating current ($i_4$) is a constant and consequently produces a charging voltage across capacitor 5 which is proportional to a constant times time.

To show the order of magnitudes involved, an example will be given. Assume that capacitor 5 varies from 20 to 50 volts, then with a supply source of 250 volts and with suitable circuit parameters, $i_2$ will vary, for example, from 460 to 400 microamperes. $i_3$ varies approximately from +20 to −20 microamperes. The current $i_4$ must supply, therefore, a total peak to peak value of 60+40 or 100 microamperes and in the proper phase. This means a peak to peak voltage on the plate 30 of triode 31 of 22 volts+30 (22 in excess of the capacitor swing) or 52 volts. This voltage can be supplied from a tube such as a 6SN7 with negligible distortion insofar as the overall effect is concerned.

By this corrective means, in addition to linearity control, a much larger voltage swing is permissible between the outputs 21 and 26 than would otherwise be possible.

What I claim is:

1. In a saw-tooth voltage wave generator, a capacitor, a load circuit coupled to said capacitor, means including a source of electrical energy for charging said capacitor, means including a periodically completed discharge path for discharging said capacitor, means for supplying a separate compensating charging current to said capacitor, a phase inverter unit responsive to a voltage developed in said load circuit, and a thermionic unit responsive to at least a portion of the output voltage of said inverter unit for controlling the supplying of said compensating current to said capacitor in such a manner that the sum of the charging currents is substantially constant.

2. In a saw-tooth voltage wave generator, a capacitor, a load circuit coupled to said capacitor, means for charging said capacitor including a source of direct current potential and a resistance connected in series relationship with said capacitor, means including a periodically completed discharge path for discharging said capacitor, and means for supplying a compensating charging current to said capacitor of such value that the sum of the charging currents is substantially constant, said compensating means comprising a phase inverter unit responsive to a voltage developed in said load circuit and a thermionic unit responsive to at least a portion of the output voltage of said inverter unit, the output circuit of said thermionic unit being connected to said capacitor in parallel relationship with said charging means.

MERWIN J. LARSEN.

REFERENCES CITED

The following references are of record in the file of this patent:

UNITED STATES PATENTS

| Number | Name | Date |
| --- | --- | --- |
| 2,037,577 | Harries | Apr. 14, 1936 |
| 2,126,243 | Busse et al. | Aug. 9, 1938 |
| 2,153,217 | Mark | Apr. 4, 1939 |
| 2,195,996 | Palmer | Apr. 2, 1940 |
| 2,232,076 | Newsam | Feb. 18, 1941 |
| 2,237,425 | Geiger et al. | Apr. 8, 1941 |
| 2,412,063 | Rosentreter | Dec. 3, 1946 |
| 2,419,606 | Stodola | Apr. 29, 1947 |